United States Patent
Wheeler

(10) Patent No.: US 11,125,199 B2
(45) Date of Patent: Sep. 21, 2021

(54) POWER FUNCTIONING SYSTEM FOR INTELLIGENT AUTOMOTIVE COMPONENT AND CONTROL METHOD USING THE SAME

(71) Applicant: Clarence Wheeler, Atlanta, GA (US)

(72) Inventor: Clarence Wheeler, Atlanta, GA (US)

( * ) Notice: Subject to any disclaimer, the term of this patent is extended or adjusted under 35 U.S.C. 154(b) by 0 days.

(21) Appl. No.: 16/594,065

(22) Filed: Dec. 30, 2019

(65) Prior Publication Data

US 2020/0173411 A1 Jun. 4, 2020

Related U.S. Application Data

(63) Continuation-in-part of application No. 16/214,118, filed on Jan. 25, 2019.

(51) Int. Cl.
  *F02N 11/08* (2006.01)
  *G07C 5/00* (2006.01)
  *B60R 25/20* (2013.01)

(52) U.S. Cl.
  CPC ...... *F02N 11/0807* (2013.01); *B60R 25/2018* (2013.01); *G07C 5/008* (2013.01)

(58) Field of Classification Search
  CPC .. H04L 63/0853; F02N 11/0807; H04W 4/46; H04W 12/02; H04W 52/0229; H04W 52/0274; G07C 9/00309
  USPC ............................................. 123/179.2, 179.1
  See application file for complete search history.

(56) References Cited

U.S. PATENT DOCUMENTS

| | | | | |
|---|---|---|---|---|
| 5,182,810 | A * | 1/1993 | Bartling | G06F 1/26 713/321 |
| 6,028,537 | A * | 2/2000 | Suman | B60K 35/00 340/988 |
| 6,956,467 | B1 * | 10/2005 | Mercado, Jr. | B60R 25/042 340/425.5 |
| 2005/0283302 | A1 * | 12/2005 | Zakrewski | B60R 25/1003 701/112 |
| 2015/0120151 | A1 * | 4/2015 | Akay | B60R 25/24 701/49 |
| 2016/0106010 | A1 * | 4/2016 | Ito | H05K 7/20854 361/707 |
| 2016/0132053 | A1 * | 5/2016 | Schwarz | B60R 25/04 701/2 |

OTHER PUBLICATIONS

Logisys RM01 Remote Control Molex Connector Kit: Accessible at: https://www.amazon.com/LOGISYS-RM01-12v-remote-control/dp/B000MXNJ7G/ref=pd_cp_pc_1 (Previously provided in parent case) (Year: 2007).*

* cited by examiner

*Primary Examiner* — Justin M Jonaitis

(57) ABSTRACT

The present invention describes an apparatus and method for remotely activating and deactivating an intelligent automotive component and distributing one or more corresponding signal to an control apparatus. Further, the present invention comprises the steps of distributing an remote activation or deactivation request signal, determining the one or more battery(s) capacity levels, distributing an respective intelligent automotive components state signal and distributing an corresponding component state signal.

6 Claims, 7 Drawing Sheets

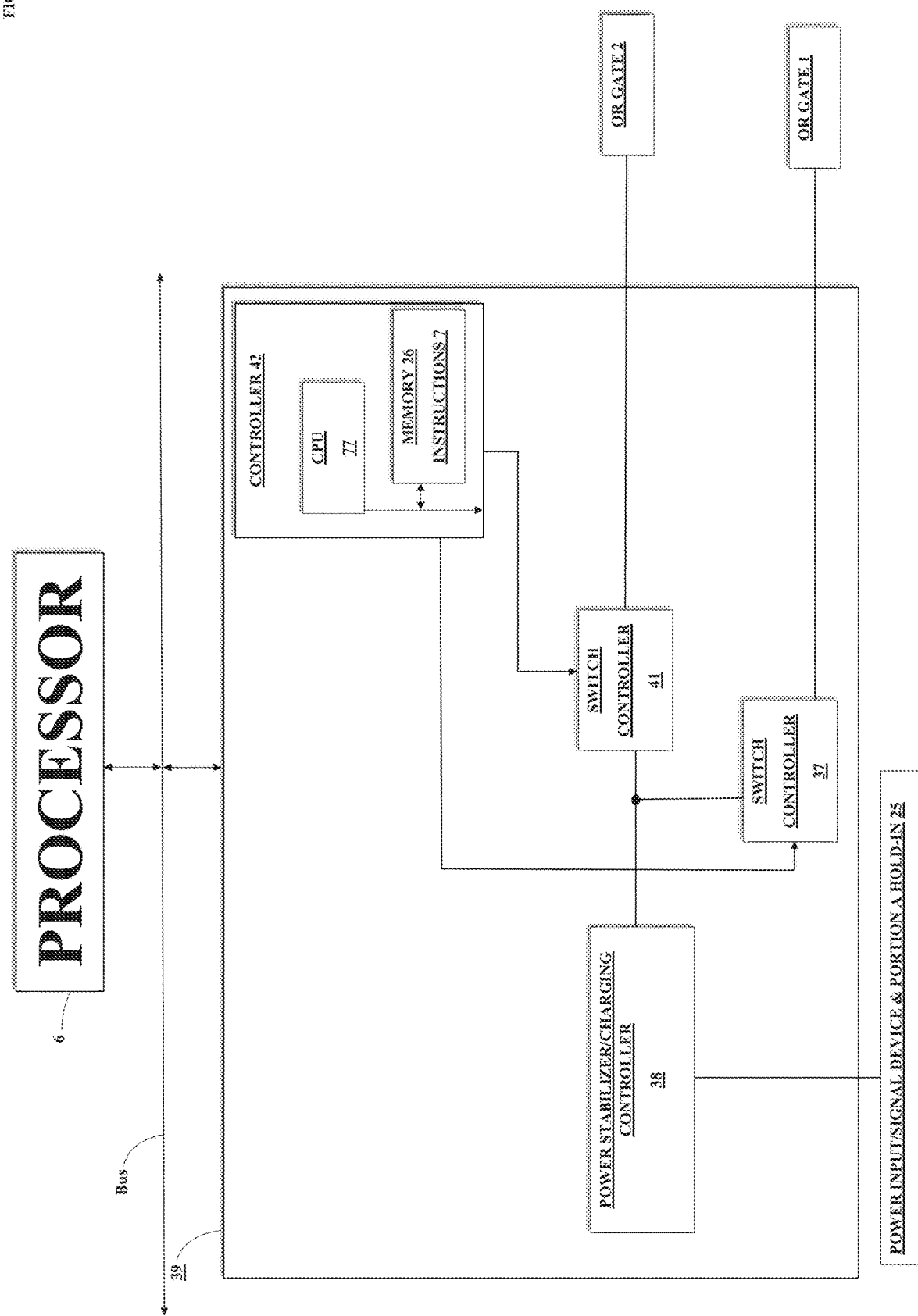

FIG. 4

| BATTERY CAPACITY CONTROL LEVEL DATABASE | |
|---|---|
| BCCS | SWITCH CONTROLLER STATE AND SCENARIO |
| BCCS 1 | Battery Capacity Control Signal 1" <br> If battery capacity levels is ≤ 25% or < 25% <br> Switch Controller [1] restrict & Switch Controller [4] allocate |
| BCCS 2 | Battery Capacity Control Signal 2" <br> If battery capacity levels is ≤ 50% or < 50% <br> Switch Controller [1] allocate & Switch Controller [4] restrict |
| BCCS 3 | Battery Capacity Control Signal 3" <br> If battery capacity levels is < 75% <br> Switch Controller [1] allocate & Switch Controller [4] restrict |
| BCCS 4 | "Battery Capacity Control Signal 4" <br> If battery capacity levels is ≤ 100%, < 100% but > 75% or ≤ 75% <br> Switch Controller [1] restrict & Switch Controller [4] restrict |

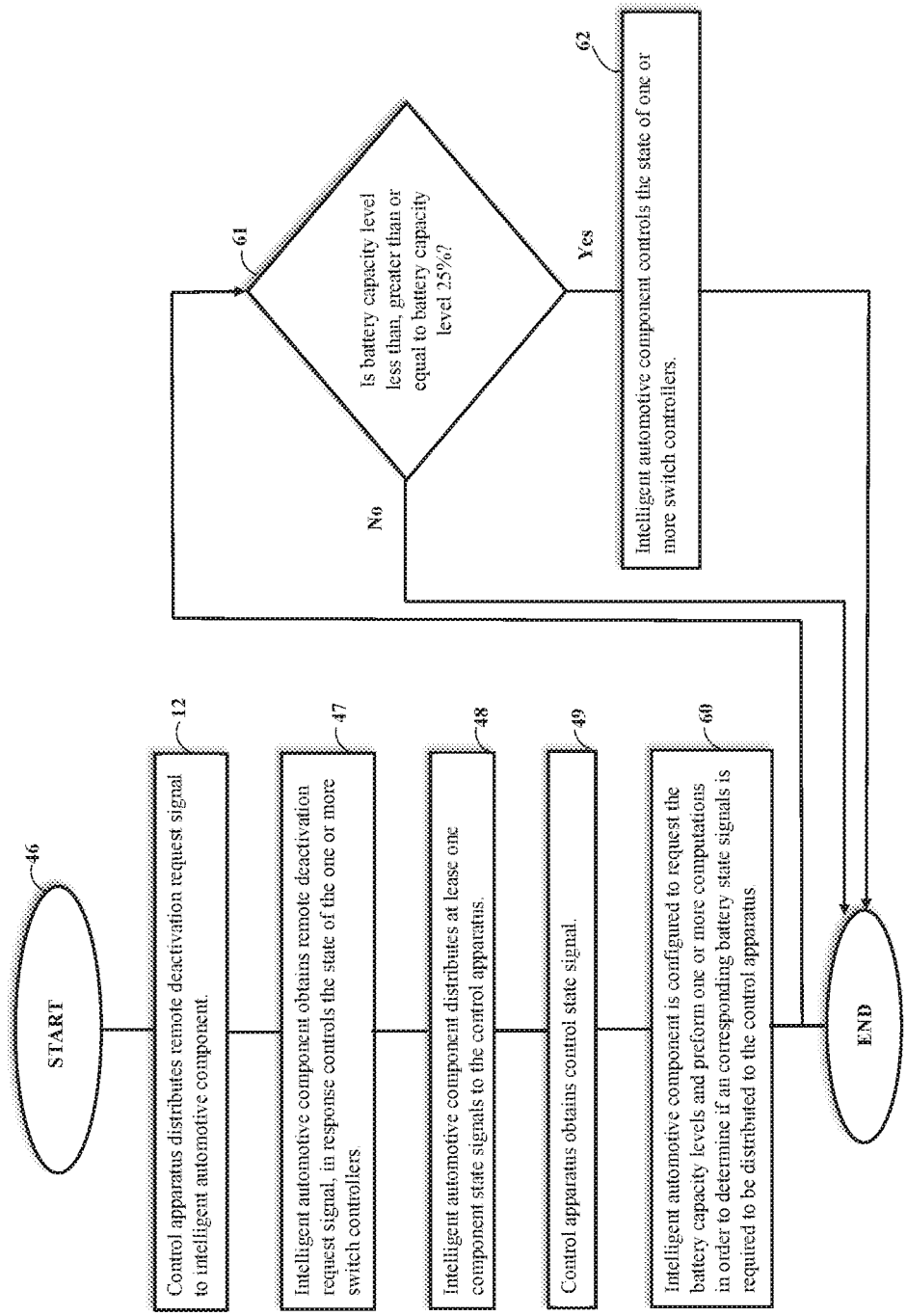

POWER FUNCTIONING SYSTEM FOR INTELLIGENT AUTOMOTIVE COMPONENT AND CONTROL METHOD USING THE SAME

CROSS-REFERENCES TO RELATED APPLICATION

Not Applicable.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

Field of the Invention

This invention relates to the field of automobiles and more specifically, to an control method for remotely activating and deactivating a intelligent automotive component.

BRIEF SUMMARY OF THE PRESENT INVENTION AND ADVANTAGES

The present invention relates to the field of intelligent automotive components and systems. One aspect of the intelligent automotive component may be to control a automotive component from a control apparatus such as a key fob, mobile terminal or any other apparatus know to one skilled in the art(s) configured to transmit one or more signals as later described below. Examples of a intelligent automotive component may be a fuel pump or engine starter. The intelligent automotive component may further include a primary power functioning unit and a secondary power functioning unit that is configure to distribute operation power to one or more components of the intelligent automotive component. The intelligent automotive component may include a transceiver configured to obtain one or more request from the control apparatus configured to activate and deactivate the intelligent automotive component via instructions provided by the one or more processor(s). The intelligent automotive component transceiver is also configured to distribute one or more notification signals to the control apparatus configured to translate the state of the intelligent automotive component via instructions provided by the one or more processor(s).

BRIEF DESCRIPTION OF THE SEVERAL VIEWS OF THE DRAWINGS

A more complete understanding of the present invention is derived by referring to the detailed description and claims when considered in connection with the Figures, wherein like reference numbers refer to similar items throughout the Figures.

FIG. 4 is a diagram illustrating the battery capacity control level database stored in the intelligent automotive component one or more memory(s).

FIG. 6 is a flowchart of a process for remotely deactivating an automobile intelligent automotive component in accordance with an exemplary embodiment of the present invention.

DESCRIPTION OF THE EMBODIMENT(S)

The numerous innovative teachings of the present invention will be described with particular reference to the preferred embodiments disclosed herein. However, it should be understood that the embodiments described provided only a few examples of the many advantages uses and innovative teachings herein. In general, statements made in the specifications of the present application do not necessarily delimit any of the various claimed inventions. Moreover, some statements may apply to some inventive features, but not to others. The following described automotive components and systems may be used to preform a duty or operative task to obtain and receive data and/or one or more instructions.

Figure 1:
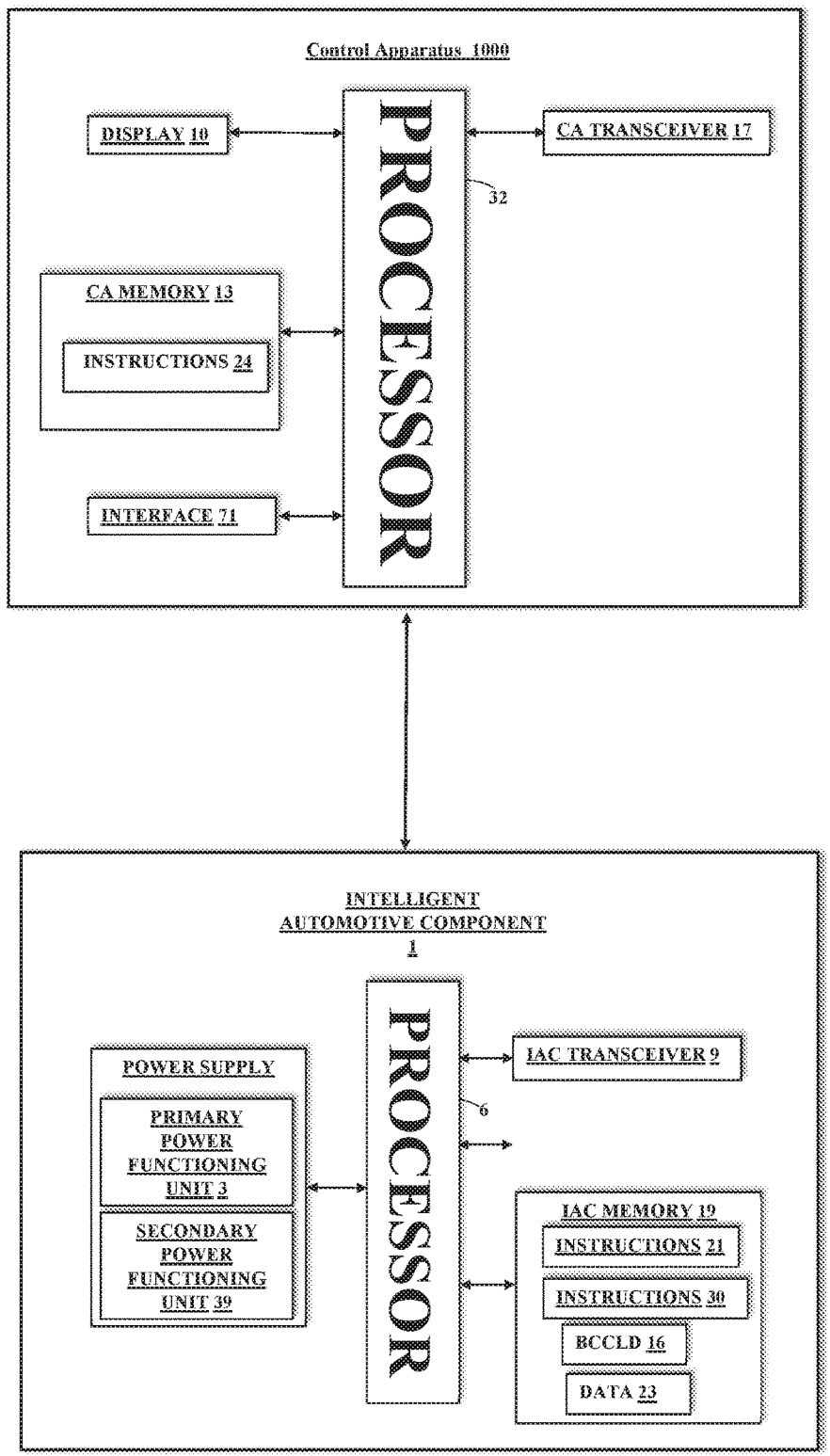
FIG. 1 is a functional block diagram of the control apparatus and intelligent automotive component for remotely activating and deactivating a intelligent automotive component, in accordance with a exemplary embodiment of the present invention.

FIG. 1 is a functional block diagram of the control apparatus 1000 and intelligent automotive component 1 for remotely activating and deactivating the intelligent automotive component(s) 1, in accordance with an exemplary embodiment of the present invention.

As shown in FIG. 1, the control apparatus 1000 comprises one or more CA processor(s) 32, an CA transceiver 17, an display 10 and one or more CA memory(s) 13.

The control apparatus 1000 illustrated in the present discloser is better identified as a key fob, smart-phone or any other similar apparatus capable of distributing a signal.

The control apparatus 1000 may be configured to execute many task and operations in order to distribute one or more remote activation or deactivation request signal(s) to the intelligent automotive component 1 via the transceiver 17 in order to activate or deactivate the one or more intelligent automotive component(s) 1 under the control of the one or more processor(s) 32. The control apparatus 1000 may further be configured to obtain one or more states (e.g., and status of the intelligent automotive component 1 via the CA transceiver 17 and display the state on the display 10.

The control apparatus 1000 comprises one or more CA processor(s) 32 configured to provide instructions to the CA transceiver 17 to distribute one or more remote activation or deactivation request signal(s) to the one or more intelligent automotive component(s) 1 via the IAC receiver 26. The CA processor(s) 32 is further configured to provide instructions for displaying one or more notification on the display 10, in response to obtaining an component state signal (CSS) or battery state signal (BSS) via the IAC transceiver 9 notifying the user the state (e.g., activation or deactivation) of the one or more intelligent automotive component(s) 1 or one or more electrical components (e.g., battery 15) of the intelligent automotive component(s) 1. The one or more CA processor(s) 32 may also execute one or more program(s) 24 stored on the one or more memory(s) 13 that controls the overall operations of the processing system 1000. The one or more processor(s) 32 may comprise any type of processor or multiple processors, single integrated circuits such as a microprocessor, or any suitable number of integrated circuit devices and/or circuit boards working in cooperation to accomplish the functions of a processing unit.

Further, the control apparatus 1000 comprises an CA transceiver 17 configured to distribute one or more activation or deactivation request signal(s) to the one or more intelligent automotive component(s) 1 under the control of the one or more processor(s) 32.

The control apparatus 1000 CA transceiver 17 is also configured to obtain one or more component state signal(s) (CSS) and battery state signal(s) (BSS) indicating the status of the one or more intelligent automotive component(s) 1 and/or the one or more electrical components of the one or more intelligent automotive component(s) 1.

The control apparatus 1000 comprise one or more memory(s) 13 that stores one or more program(s) that executes one or more instructions 24 and processes. The memory(s) 13 may further store various types of data to support the processing, control, or storage requirements of the control apparatus 1000. Examples of such data may include an operating program, software instructions for controlling the control apparatus 1000 execution commands etc. The memory(s) 13 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, cardtype memory, or other similar memory or data storage device or any type of suitable memory. Further, the one or more memory(s) 13 stores instructions 24 that, when processed by the one or more processor(s) 32, enables the one or more processor(s) 32 to: obtain a component state signal (CSS) or a respective battery state signal (BSS) via the intelligent automotive component 1, in response to obtaining the component state signal (CSS) or a battery state signal (BSS) the one or more processor(s) 32 is configured to update the contextual status of the intelligent automotive component 1 and contextual battery capacity level associated with obtained component state signal (CSS) or battery state signal (BSS) on the display 10. For instance, the state of the intelligent automotive component 1 may be displayed on the display 10 labeled "IAC Activated or IAC Deactivated" other suitable identifications may be displayed to notify the user the state of the intelligent automotive component 1. While on the other hand, the battery capacity levels may be displayed on the display 10 as an battery gage and number value representing an percentage (e.g., 75%) or any other suitable battery capacity level measurement means known to one skilled in the art(s). Furthermore, the one or more memory(s) 13 storing instructions 24 is a example of a computer program product, comprising a non-transitory computer usable medium having a computer readable program code adapted to be executed to implement a method.

The control apparatus 1000 comprise an display 10 that may include an panel. The panel and the touch panel may be configured with one module. The display 10 further includes a control circuit for controlling the panel. The display 10 may be implemented using known display technologies such as a liquid crystal display (LCD), a thin film transistor-liquid crystal display (TFT-LCD), an organic light-emitting diode display (OLED), active matrix organic light-emitting diode (AMOLED) or a three-dimensional display. The display 10 may further be coupled to a processing system, in order to obtain instructions from the one or more processor(s) 32.

The control apparatus 1000 comprises an interface 71 that may allocate communication to an processing system via an user input, a system operator, and/or another computer system, and can be implemented using any suitable method and apparatus.

Also shown in FIG. 1, the intelligent automotive component(s) (IAC) 1 comprises a respective power-link apparatus as better described in U.S. application Ser. No. 16/214,118, the power-link apparatus preferably includes one or more IAC processor(s) 6, one or more memory(s) 19, a IAC transceiver 9, a power supply comprising a primary power functioning unit 3 and an secondary power functioning unit 39. The power-link apparatus may also include one or more ports configured to allocate coupling the automobile power/signal input device or portion A hold-in 25 connector to distribute an input power from the automobile and obtain one or more signals from the power-link apparatus in order to be distributed to one or more components (e.g., fuel level sensor) of the automobile, and configured to allocate coupling portion B hold-in and the fuel pump portion terminals to the power-link apparatus.

The intelligent automotive component(s) 1 illustrated in the present discloser may be better understood in U.S. application Ser. No. 16/214,118 Titled "Intelligent Automotive Component" or any other similar automotive component known to one skilled in the art(s).

The one or more IAC processor(s) 6 is configured to determine if at least an remote activation or deactivation request signal has been obtained via the control apparatus 1000, determines one or more battery capacity levels of the battery 27, distribute one or more component state signal(s) (CSS) and battery state signal(s) (BSS) to the CA transceiver 17 notifying the user the state (e.g., activation or deactivation) of the one or more intelligent automotive component(s) 1 or one or more electrical components (e.g., battery 27) of the intelligent automotive component(s) 1 and may perform computations and control functions of the control apparatus 1000 or portions thereof. In addition, the one or more IAC processor(s) 6 execute one or more programs stored on the memory(s) 19 that controls the overall operations of the one or more intelligent automotive components 1. The one or more CA processor(s) 6 may comprise any type of processor or multiple processors, single integrated circuits such as a microprocessor, or any suitable number of integrated circuit devices and/or circuit boards working in cooperation to accomplish the functions of a processing unit Further, the intelligent automotive component(s) 1 IAC transceiver 9 is configured to distribute an components state signal (CSS) and battery state signal (BSS) and/or instructions to the control apparatus 1000 under the control of the one or more IAC processor(s) 6. The intelligent automotive component(s) 1 IAC transceiver 9 is also configured to obtain one or more activation or deactivation request signal(s) from the control apparatus 1000 via the CA transceiver 17 under the control of the one or more IAC processor(s) 6.

The one or more memory(s) 19 stores one or more programs or application, and instructions that executes one or more instructions 21 and processes. In addition, the one or more memory(s) 19 also stores an battery capacity control level databases (BCCLD) 16 that store data indicating one or more battery capacity control signals (BCCS) and battery capacity levels. The memory(s) 19 may also stores various types of data to support the processing, control, or storage requirements of the intelligent automotive component 1. Examples of such data may include an operating program, software instructions for controlling the intelligent automotive component 1 execution commands, confirmed battery capacity levels, voltage and currents output information and battery level references. The one or more memory(s) 19 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, cardtype memory, or other similar memory or data storage device or any type of suitable memory.

Specifically, the one or more memory(s) 19 stores instructions 21 that, when processed by the one or more IAC processor(s) 6, enabling the one or more IAC processor(s) 6 to: obtain battery capacity level(s) via the power functioning controller 20 via the battery measurement circuitry 33 by way of distributing an battery capacity request signal (BCRS) to the power functioning controller 20 in response to obtaining an remote activation or deactivation request signal via the control apparatus 1000. Further, the one or more processor(s) 6 is configured to execute one or more computations to determine if obtained battery capacity levels is greater than, less than or equal to an predetermine battery capacity level (BCL) within the BCCLD 16 in order to determine an respective battery capacity control signal (BCCS) to distribute to the power functioning controller 20. For example, if the one or more IAC processor(s) 6 determine that the obtained contextual battery capacity levels is < (e.g., less than) battery capacity level 75% the one or more processor(s) 6 is further configured to distribute battery capacity control signal 3 (BCCS3) to the power functioning controller 20 to control the state of switch controller[1] 4 allocating voltage power & switch controller[4] 43 to restricting voltage power (e.g., current) to charge the one or more battery(s) 27.

Additionally, the one or more memory(s) 19 stores instructions 30 that, when processed by the one or more IAC processor(s) 6, enables the one or more IAC processor(s) 6 to: periodically obtain contextual battery capacity level(s) from the power functioning controller 20 via the battery measurement circuitry 33 by way of distributing an battery capacity request signal (BCRS) to the power functioning controller 20, in response to obtaining the contextual battery capacity levels the one or more processor(s) 6 is configured to request the confirmed battery capacity levels (CBCL) stored in the one or more memory(s) 19 as data 23. In response to obtaining the confirmed battery capacity level the one or more processor(s) 6 is configured to execute one or more computation to determine if the contextual battery capacity levels is less than, greater than or equal to the confirmed battery capacity level (CBCL) in order to determine if a battery state signal is needed to be distributed to the control apparatus 1000 to update a prior battery capacity level.

For instance, if the one or more IAC processor(s) 6 determine that the obtained contextual battery capacity levels is ≤ (e.g., equal to) the confirmed battery capacity level no battery state signal (BSS) is distributed to the control apparatus 1000, if the obtained battery capacity level is < (e.g., less than) or > (e.g., greater than) the confirmed battery capacity level a battery state signal (BSS) is distributed to the control apparatus 1000 via the IAC transceiver 9 under the control of the one or more IAC processor(s) 6.

Furthermore, the one or more memory(s) 19 storing instructions (21, 30) is a example of a computer program product, comprising a non-transitory computer usable medium having a computer readable program code adapted to be executed to implement a method.

The one or more memory(s) 19 store an battery capacity control level database (BCCLD) 16 that further comprises a set of battery capacity control levels (BCCL) which determines if the one or more switch controllers allocate or restrict power to one or more battery(s) 27, in response to obtaining a remote activation or deactivation request signal and/or if a predetermine battery capacity level is less than, greater than or equal to a predetermine battery capacity level.

The one or more memory(s) 19 store confirmed battery capacity levels (CBCL) as data 23 which determines the current battery capacity level represented as a percentage (e.g., 30%). For instance, the historical confirmed battery capacity levels may be updated with contextual confirmed battery capacity levels, in response to the one or more processor(s) 6 preforming one or more computations and determining if the obtained contextual battery capacity levels is less than or greater than the prior confirmed battery capacity levels.

The intelligent automotive component(s) 1 comprises an primary power functioning unit 3 configured to distribute voltage power (e.g., current) to the processing circuit 44 and the one or more electrical components of the intelligent automotive component(s) 1 via the one or more battery(s) 27 during activation and deactivation of the intelligent automotive component 1 and may be referred to as operation power.

The intelligent automotive component(s) 1 comprises an secondary power functioning unit 39 configured to allocate or restrict voltage power (e.g., current) to the fuel pump portion wire lead and portion B hold-in 36 of the intelligent automotive component(s) 1 via obtaining a first switch control signal (FSCS) by the one or more IAC processor(s) 6 in response to obtaining a remote activation or deactivation request signal via the control apparatus 1000.

Further, during deactivation of the intelligent automotive component 1 the secondary power functioning unit 39 is also configured to obtain voltage power (e.g., current) from the automobile power/signal input device and portion A hold-in 25 to recharge the one or more battery(s) 27 when the automobile ignition is at the run position, in response to the one or more processor(s) 6 requesting and obtaining contextual battery capacity levels via the power functioning controller 20 and determining that the contextual battery capacity levels is < (e.g., less than) or ≤ (e.g., equal to) battery capacity level 25%.

The primary and secondary power functioning unit (3, 39) may be the like(s) of an power management module, power management IC (PMIC), power control circuit or any known power control system known to one skilled in the art(s). In addition, the primary and secondary power function unit (3, 39) circuits may comprises transistor, resistors, capacitor, voltage regulator, logic gates, inverters, etc. configured to obtain, hold and distribute an suitable amount of operation power to the one or more electrical components.

Various embodiments described herein may be implemented in a computer-readable medium using computer software. The various embodiments may also be implemented in hardware. A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by the one or more processor(s) (6, 32) and power functioning controller 20. A software implementation of the embodiments described herein may be implemented with separate software modules, such as procedures and functions, each of which perform one or more of the functions and operations described herein. The software code may be implemented with a software application written in any suitable programming language and may be stored in the one or more memory(s) (13, 19) for execution by the one or more processor(s) (6, 32) and/or power functioning controller (20, 42).

Figure 2A:
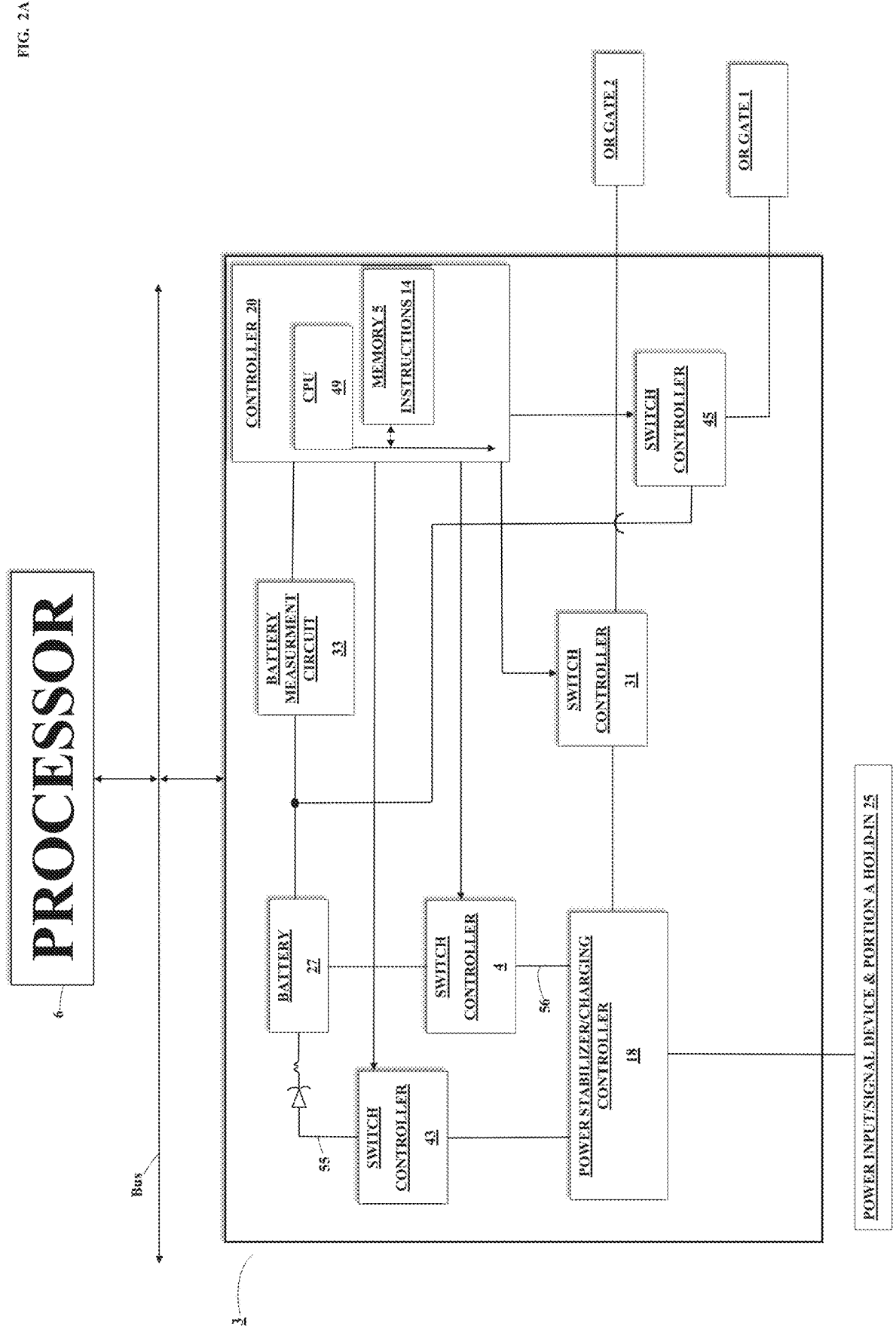
FIG. 2 is a block illustration showing the architecture of the intelligent automotive component primary power functioning unit and secondary power functioning unit according to one embodiment of the present invention.

Accordingly FIG. 2A-2B is an illustration of the power supply circuit, the primary power functioning unit 3 is configured to distribute operation power (e.g., current) to the processing circuit 44 and the one or more electrical components of the intelligent automotive component 1 via the one or more battery(s) 27, and is configured to obtain a data carrier current from the automobile power/signal input device and portion A hold-in 25 to boot the processing circuit 44 more battery(s) 27 in response to the automobile ignition at the run position and/or the one or more processor(s) 6 distributing a switch control signal to the power functioning controller 20 to control the state of switch controller[4] 43 to allocate voltage power (e.g., current) to the one or more battery(s) 27, and switch controller[6] 45 allocating voltage power (e.g., current) to the processing circuit 44.

The secondary power functioning unit 39 is configured to obtain voltage power (e.g., current) from the automobile power/signal input device and portion A hold-in 25 and allocate or restrict voltage power (e.g., current) to the fuel pump portion and hold-in windings 36, in response to the one or more processor(s) 6 obtaining a remote activation or deactivation request signal via the control apparatus 1000.

The intelligent automotive component 1 comprises a bus 1001 comprising a circuit for connecting the primary power functioning unit 3, secondary power functioning unit 39 to the one or more processor(s) 6 and other electrical components for delivering one or more communication signals (e.g., switch control signals, battery state request signal, messages, data or instructions) between the components.

The primary power functioning unit 3 comprises one or more battery(s) 27, a power stabilizer/charging controller 18, switch controller[1] 4, switch controller 231, switch controller[4] 43, switch controller[6] 45, a battery measurement circuitry 33 and a power functioning controller 20. The primary power functioning unit 3 comprises of one or more battery(s) 27 such as an rechargeable battery, smart-battery or the likes capable of obtaining an plurality of voltage (e.g., current) intensity levels, a power stabilizer/charging controller 18 configured to stabilize input voltage power (e.g., currents) supplied by the automobile power/signal input device and portion A hold-in 25 and controlling the charging tasks of the one or more battery(s) 27. Further, the power stabilizer/charging controller 18 is configured to distribute a higher current intensity level than the current intensity levels of signal path 256 to the one or more battery(s) 27 via signal path[1] 55 in response to the one or more processor(s) 6 determining that the battery capacity level is equal to or less than battery capacity level 25% and the one or more processor(s) 6 distributing a battery capacity control signal 1 (BCCS) to the power functioning controller 20 to control the state of switch controller[4] 43 allocating voltage power to the one or more battery(s) 27 and control the state of switch controller[1] 4 restricting voltage power to the one or more battery(s) 27 during activation of the intelligent automotive component 1.

This operational function may be accomplished due to signal path[1] 55 comprising an transistor and resistor disposed on its path that amplifies the current intensity level to the battery(s) 27. The primary power functioning unit 3 comprises a switch controller[1] 4 having duties to switching between allocating or restricting voltage power (e.g., current) to the one or more battery(s) 27, switch controller[4] 43 having duties to switching between allocating or restricting voltage power (e.g., current) to the one or more battery(s) 27 when the battery capacity level is equal to or less than battery capacity level 25%, a switch controller[6] 45 having duties to switching between allocating or restricting operational power (e.g., current) from the one or more battery(s) 27 to the processing circuit 44 via $_{or}gate^1$ and a switch controller[2] 31 having duties of switching between allocating or restricting voltage power (e.g., current) to the the fuel pump portion and hold-in windings 36 via $_{or}gate^2$.

The primary power functioning unit 3 comprises a battery measurement circuit 33 configured to determine the one or more battery(s) 27 capacity levels. The battery measurement circuitry 33 may also read certain data related to the operation of the one or more battery(s) 27 such as battery current, battery voltage, battery temperature, etc. To perform these measurements, the battery measurement circuitry 33 may include an analog to digital converter (ADC) (not shown) and other components.

The primary power functioning unit 3 comprises a power functioning controller 20 configured to control the one or more task operations of the primary power functioning unit 3 such as the controlling of allocating and restricting of power of the one or more switch controllers. The power functioning controller 20 is also configured to distribute battery(s) capacity levels to the one or more processor(s) 6 in response to obtaining a battery state request signal (BSRS). The power functioning controller 20 comprises an Central Processing Unit (CPU) 49 that comprises one or more cores. The power functioning controller 20 comprises one or more memory(s) 5 for storing one or more programs or instructions 14 to control the one or more switch controllers and for obtaining one or more battery capacity levels, in response to obtaining an switch controller signal or battery capacity request signal via the one or more processor(s) 6. The CPU 49 and memory(s) 5 may be interconnected via a internal bus.

The secondary power functioning unit 39 comprises a power stabilizer/charging controller 40, switch controller[3] 41, switch controller[5] 37 and a power functioning controller 42. The secondary power functioning unit 39 comprises a power stabilizer/charging controller 40 configured to stabilize input voltage power (e.g., currents) supplied by the automobile power/signal input device and portion A hold-in 25 and controlling the output distribution of the voltage power (e.g., current). The secondary power functioning unit 39 comprises a switch controller[3] 41 having duties of switching between allocating and restricting voltage power (e.g., current) to the fuel pump portion and hold-in windings 36 via $_{or}$gate$^2$ in response to the intelligent automotive component 1 obtaining a remote activation or deactivation request signal via the control apparatus 1000 and the one or more processor(s) 6 generating and distributing a second switch control signal to the power functioning controller 42.

An switch controller$^5$ 37 having duties of switching between allocating or restricting voltage power (e.g., current) to the processing circuit 44 $_{or}$gate$^1$, in response to the intelligent automotive component 1 obtaining a remote deactivation request signal via the control apparatus 1000, the one or more processor(s) 6 generating and distributing a second switch control signal to the power functioning controller 42 and the one or more processor(s) 6 requesting the battery capacity level and determining that the obtained battery capacity level is ≤(e.g., equal to) or < (e.g., less than) battery capacity level 25%.

The secondary power functioning unit 39 comprises an power functioning controller 42 configured to control one or more task operations of the secondary power functioning unit 39 such as controlling the switching of the switch controllers respectively.

The power functioning controller 42 also comprises a Central Processing Unit (CPU) 77 that comprises one or more cores. The power functioning controller 42 comprises one or more memory(s) 26 for storing one or more control programs and instructions 7 to control the one or more switch controllers, in response to obtaining switch controller signal via the one or more processor(s) 6. The CPU 77 and memory(s) 26 may be interconnected via a internal bus. Further, the primary power functioning unit 3 and secondary power functioning unit 39 is coupled to the one or more processor(s) 6 via a bus 1001 and configured to obtain instruction and signals to execute one or more task.

Furthermore, the OR gates used in the present invention is an digital logic gate that implements logical disjunction it behaves according to the truth table; A HIGH output (1) results if one or both of the inputs to the gate are HIGH (1). If neither input is high, a LOW output (0) results. In another sense, the function of OR effectively finds the maximum between two binary digits, just as the complementary and function finds the maximum.

According to the present invention, during activation of the intelligent automotive component 1 power is allocated to the processing circuit 44 by the one or more battery(s) 27 of the primary power functioning unit 3 via $_{or}$gate$^1$ and power distributed from the secondary power functioning unit 39 is restricted at $_{or}$gate$^1$ via switch controller$^5$ 37 restricting power to $_{or}$gate$^1$. For instance, during activation of the intelligent automotive component 1 the primary power functioning unit 3 is configured to distribute power to the processing circuit 44, in this case the primary power functioning unit 3 power is high so the logic value input to $_{or}$gate$^1$ is 1 and the secondary power functioning unit 39 is low so the logic value input to $_{or}$gate$^1$ is 0. Thus, in this circumstance, operation power is distributed to the processing circuit 44 by the primary power functioning unit 3.

In conjunction, during activation of the intelligent automotive component 1 power is allocated to the fuel pump portion and hold-in windings 36 by the secondary power functioning unit 39 via $_{or}$gate$^2$ and power distributed from the primary functioning unit 3 is restricted at $_{or}$gate$^2$ via switch controller$^2$ 31 restricting power to $_{or}$gate$^2$. For instance, during activation of the intelligent automotive component 1 the secondary power functioning unit 39 is configured to distribute power to the fuel pump portion wiring lead and hold-in windings 36, in this case the secondary power functioning unit 39 power is high so the logic value input to $_{or}$gate$^2$ is 1 and the primary power functioning unit 3 is low so the logic value input to $_{or}$gate$^2$ is 0. Thus, in this circumstance, operation power is distributed to fuel pump portion and hold-in windings 36 by the secondary power functioning unit 39.

However, during deactivation of the intelligent automotive component 1 if the one or more battery(s) 27 battery capacity level reaches an value of 0% no power is distributed from the primary power functioning unit 3 to the processing circuit 44 via $_{or}$gate$^1$ in order to power the processing circuit 44. In this instance, when the automobile ignition is at the run position power is distributed from the automobile power/signal input device and portion A hold-in 25 to the secondary power functioning unit 39 to $_{or}$gate$^1$ via switch controller$^5$ 37 allocating power to $_{or}$gate$^1$. In conclusion, during deactivation of the intelligent automotive component 1 and the battery capacity levels at a value of 0% the secondary power functioning unit 39 is configured to distribute power to the processing circuit 44 when the ignition is at the run position, in this case the primary power functioning unit 3 power is low so the logic value input to $_{or}$gate$^1$ is 0 and the secondary power functioning unit 39 is high so the logic value input to $_{or}$gate$^1$ is 1. Thus, in this circumstance, operation power is distributed to the processing circuit 44 by the secondary power functioning unit 39.

The primary power functioning unit 3 and secondary power functioning unit 39 obtains power from the automobile power/signal input device and portion A hold-in 25 when the ignition is at the run position.

Figure 3:
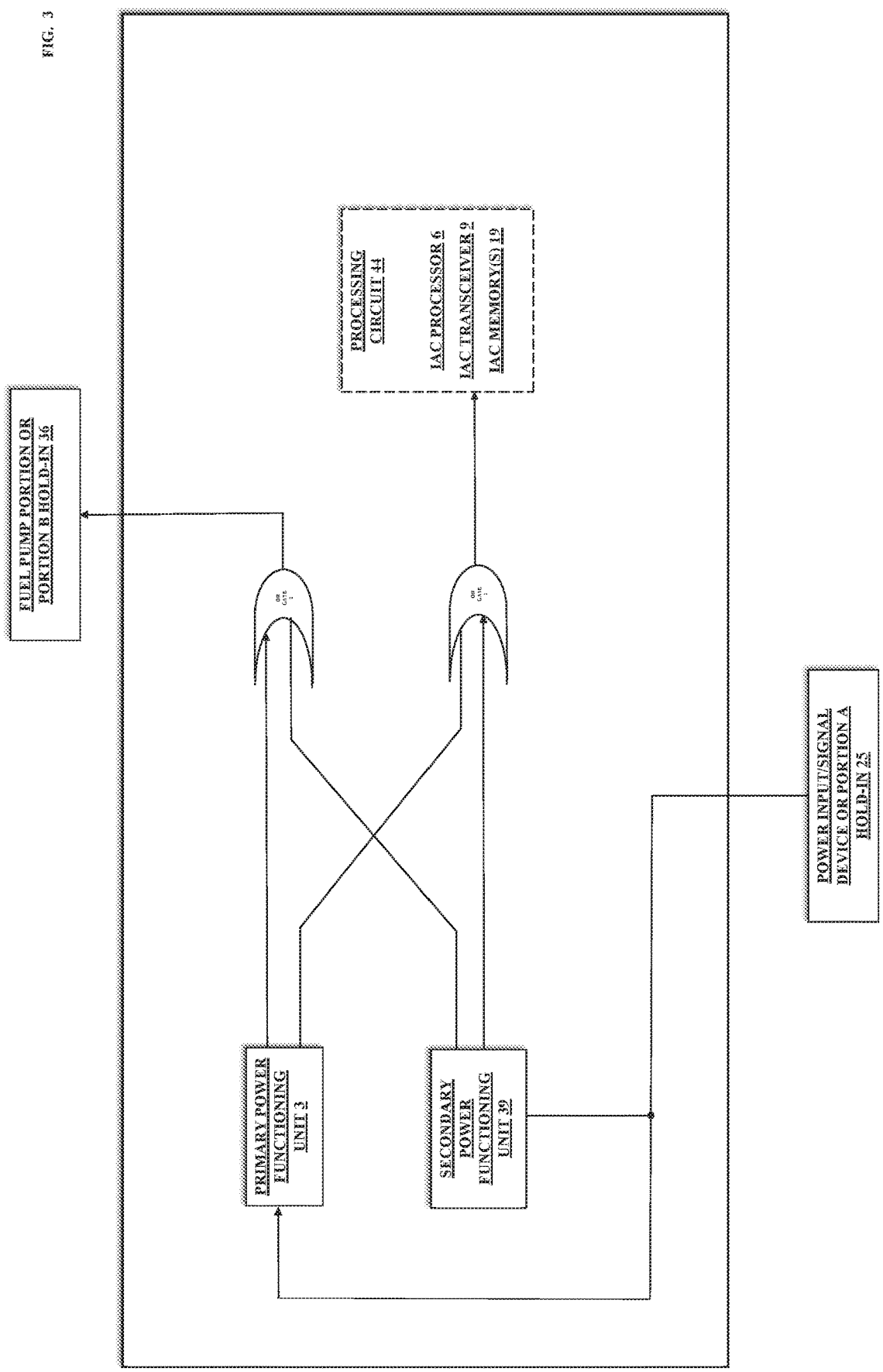
FIG. 3 is illustrates the primary power functioning unit and secondary power functioning unit in cooperation with the intelligent automotive component for obtaining voltage power (e.g., current) and distributing operation power in accordance with a preferred embodiment of the present invention.

FIG. 3 illustrates the one or more power functioning units in cooperation with the intelligent automotive component 1 for obtaining voltage power (e.g., current) from the one or more components and the automobile and distributing operation power to one or more components of the intelligent automotive component(s) 1 in accordance with a preferred embodiment of the present invention.

According to FIG. 3, the power functioning circuitry of the intelligent automotive component 1 in accordance with the present invention comprises: a primary power functioning unit 3 configured to distribute main power to operate the processing circuitry 44 of the intelligent automotive component 1 via the one or more battery(s) 27 by way of distributing operation power to the processing circuitry 44 via $_{or}$gate$^1$; a secondary power functioning unit 39 configured to obtain power (e.g., current) from the automobile power/signal input device and portion A hold-in 25 and distribute power (e.g., current) to the fuel pump portion wire lead and portion B hold-in 36 via $_{or}$gate$^2$.

The secondary power functioning unit 39 is also configured to distribute operation power to the processing circuit 44 via $_{or}$gate$^2$. The secondary power functioning 39 unit may distribute any suitable voltage necessary according to specifications required to operate the fuel pump portion and energize the hold-in coils disposed at the engine starter plunger efficiently. For instance, the secondary power functioning unit 39 may provide anywhere in the range of 5.0V to 12V. Further, $_{or}$gate$^1$ obtains operation power from the primary power functioning unit 3 and secondary power functioning unit 39 in cause to the primary power functioning unit 3 and secondary power functioning unit 39 being respectively couple to $_{or}$gate$^1$. And $_{or}$gate$^2$ obtains operation power from the secondary power functioning unit 39 and primary functioning unit 39 in cause to the primary power functioning unit 3 and secondary power functioning unit 39 being respectively couple to $_{or}$gate$^2$. Further, $_{or}$gate$^1$ and $_{or}$gate$^2$ distributes the operation power on a single path due to different voltage levels and voltage levels increasing and rising at any giving interval varying on one or more operational phases. Any suitable gate may be used to obtain and distribute operation power throughout the intelligent automotive component 1.

Further, the processing circuit 44 is configured to obtain operation voltage via $_{or}$gate$^1$ and distribute a predetermine voltage to each respective electrical component according to the requirements to energize each respective electrical component of the intelligent automotive component 1. The processing circuit 44 may comprise any suitable voltage regulators, resistor, transistors, capacitors, inverters, logic gates etc. configure to obtain input power via $_{or}$gate$^1$ and output a voltage to each respective electrical component (e.g., IAC transceiver and processor(s) 6 etc.) of the intelligent automotive component 1 in an predetermine range. For instance, 2.7V may be supplied to the processor(s) 6, 2.7V may be distributed to the IAC transceiver 9 etc.

Additionally, the secondary power functioning unit 39 is configured to distribute a operation voltage to the processing circuit 44 via $_{or}$gate$^1$ in response to the one or more battery(s) 27 of the primary power processing unit 3 capacity level reaching an value of 0%. This may be accomplished by booting the processing circuit 44 by a data carrier current of the automobile power/signal input device and portion A hold-in 25 when the automobile ignition is at the run position.

In the preferred embodiment of the present invention, when the intelligent automotive component 1 obtains a remote activation request signal (RARS) via the control apparatus 1000 the secondary power functioning unit 39 distributes voltage power (e.g., current) to the fuel pump portion wire lead and portion B hold-in 36. This is accomplished by the one or more processor(s) 6 distributing a second switch control signal (SSCS) to the power functioning controller 42 to allocate voltage power (e.g., current) to the fuel pump portion wire lead and portion B hold-in 36 via $_{or}$gate$^2$ by way of controlling the state of switch controller$^3$ 41 allocating an voltage power to $_{or}$gate$^2$. During the operational stage and in conjunction of obtaining the remote activation request signal (RARS) the one or more processor(s) 6 is configured to request the one or more battery(s) 27 contextual battery capacity levels via the power functioning controller 20 to and execute one or more computations to determine if the obtained contextual battery(s) capacity levels is greater than less then or equal to a predetermine battery capacity level (BCL) within the (BCCLD) 16 to determine a respective battery capacity control signal (BCCS) to distribute to the power functioning controller 20.

Further, during this operational stage operation main power is distributed to the processing circuit 44 and the one or more electrical components by the primary power functioning unit 3 via $_{or}$gate$^1$.

However, when the intelligent automotive component 1 obtains a remote deactivation request signal (RDRS) via the control apparatus 1000 the secondary power functioning unit 39 restricts voltage power (e.g., current) to the fuel pump portion wire lead and portion B hold-in 36. This is accomplished by the one or more processor(s) 6 distributing a second switch control signal (SSCS) to the power functioning controller 42 to restrict voltage power (e.g., current) to the fuel pump portion wire lead and portion B hold-in 36 via $_{or}$gate$^2$ by way of controlling the state of switch controller$^3$ 41 restricting power to $_{or}$gate 2. Thus, during this operational stage operation main power is distributed to the processing circuit 44 and the one or more components by the primary power functioning unit 3 via $_{or}$gate$^1$. Further, during this operational stage and in conjunction of obtaining the remote deactivation request signal (RDRS) the one or more processor(s) 6 is configured to request the one or more battery(s) 27 contextual battery capacity levels via the power functioning controller 20 to and execute one or more computations to determine if the obtained contextual battery(s) capacity levels is greater than less then or equal to a predetermine battery capacity level (BCL) within the (BCCLD) 16 in order to determine a respective battery capacity control signal (BCCS) to distribute to the power functioning controller 20.

Moreover, during deactivation of the intelligent automotive component 1 at any given instant if the one or more processor(s) 6 determines the battery capacity levels is equal to or less than battery capacity level 25% the one or more processor(s) 6 is configure to distribute a switch control signal to the power functioning controller 42 to control the state of switch controller$^5$ 37 allocating voltage power (e.g., current) to the processing circuit 44 via $_{or}$gate$^1$ when the automobile ignition is at the run position to boot the intelligent automotive component 1 processing circuit 44. The reason why this action is useful is that by the time the intelligent automotive component 1 is reactivated the battery capacity level may be at a value of 0% meaning the primary power functioning unit 3 battery 27 is no longer able to distribute main power to the processing circuit 44, in contrast this allocates the user of the automobile to boot the processing circuit 44 and the one or more operating system programs when the automobile ignition is at the run position by the automobile supplying power and the automobile power/signal input device and portion A hold-in 25 distributing a data carrier current to the secondary power functioning unit 39 to boot the processing circuit 44 via $_{or}$gate$^1$.

FIG. 4 illustrates the battery capacity control level database (BCCLD) 16 stored within the one or more memory(s) 19 indicating the one or more battery capacity control signals, switch controller states, scenarios and instructions used in order to determine distributing a respective battery capacity control signal (BCCS) to the power functioning controller 20 to control the state of the one or more switch controllers to charge the one or more battery(s) 27 of the primary power functioning unit 3.

The BCCLD 16 comprises instructions which associates a respective battery capacity control signal with a switch controller state and scenario (e.g., allocating or restricting power to charge the one or more battery(s) 27). The respective battery capacity control signals of the BCCLD 16 are indicated as battery capacity control signal 1, battery capacity control signal 2, battery capacity control signal 3, and battery capacity control signal 4.

Specifically, battery capacity control signal 4 indicates a scenario where; in cause if the obtained battery capacity levels is ≤100% (e.g., equal to), <100% (e.g., less than) but >75% (e.g., greater than) or ≤75% (e.g., equal to) the one or more processor(s) 6 is configured to distribute battery capacity control signal 4 to the power functioning controller 20 where switch controller 14 restricts & switch controller$^4$ 43 restricts power to the one or more battery(s) 27. Battery capacity control level 3 indicates an scenario where; in cause if the obtained battery capacity levels is <75% (e.g., less than) the one or more processor(s) 6 is configured to distribute battery capacity control signal 3 (BCCS3) to the power functioning controller 20 where switch controller$^1$ 4 allocate power & switch controller$^4$ 43 restrict power to the one or more battery(s) 27.

Battery capacity control level 2 indicates an scenario where; in cause if the obtained battery capacity levels is ≤50% (e.g., equal to) or ≤50% (e.g., less than) the one or more processor(s) 6 is configured to distribute battery capacity control signal 2 to the power functioning controller 20 where switch controller[1] 4 is at an state allocating power (e.g., current) to the one or more battery(s) 27 and switch controller[4] 43 is at an off state restricting power to the one or more battery(s) 27.

Battery capacity control level 1 indicates an scenario where; in cause if the obtained battery capacity levels is ≤25% (e.g., equal to) or <25% (e.g., less than) the one or more processor(s) 6 is configured to distribute battery capacity control signal 1 to the power functioning controller 20 where switch controller[1] 4 at an state restricting power (e.g., current) to the one or more battery(s) 27 and switch controller[4] 43 is at an state allocating power to the one or more battery(s) 27.

For instance, during activation of the one or more intelligent automotive component(s) 1 the one or more processor(s) 6 may periodically request the battery capacity levels via the primary power functioning unit 3 battery measurement circuit 33, in response to obtaining the contextual battery capacity levels the one or more processors 6 execute one or more computation task as to determining if the obtained contextual battery capacity level is equal to, less than or greater than a predetermine battery capacity level. In addition, during recharging of the one or more battery(s) 27 the one or more processor(s) 6 periodically request the battery capacity levels at a predetermine interval unit the battery measurement circuit 33 returns a battery capacity level value of 100%.

Figure 5:
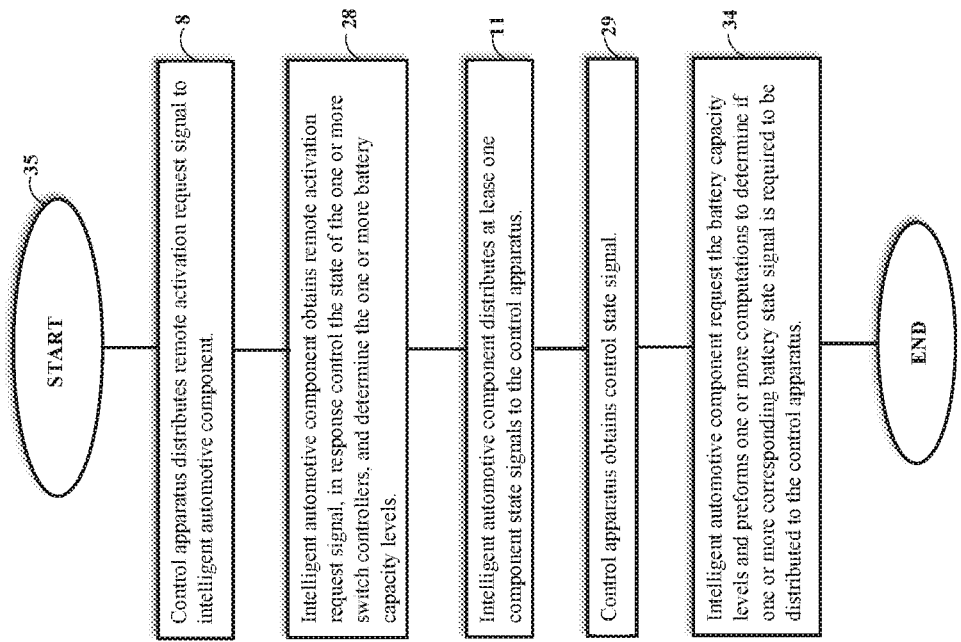
FIG. 5 is a flowchart of a process for remotely activating an automobile intelligent automotive component in accordance with an exemplary embodiment of the present invention.

FIG. 5 is a flowchart of a process for remotely activating a automobile intelligent automotive component 1 in accordance with an exemplary embodiment of the present invention. The method 35 comprises the steps of the control apparatus 1000 distributing a respective activation request signal to the intelligent automotive component 1 via the CA transceiver 17, upon the intelligent automotive component(s) 1 obtaining the respective activation request signal via the IAC transceiver 9 the one or more processor(s) 6 is configured to control the state of the one or more switch controller(s) to allocate or restrict voltage power (e.g., current) to the fuel pump portion wire lead and portion B hold-in 36, obtain battery capacity levels and the state of the intelligent automotive component 1 and distribute one or more notifications to the control apparatus 1000 via the IAC transceiver 9.

Method 35 begins with the user of the control apparatus 1000 distributing a remote activation request signal (RARS) to activate the one or more intelligent automotive component(s) 1 (step 8). In a preferred embodiment, a user may distribute the remote activation or deactivation request signal by physical interaction with an input button disposed on the control apparatus 30 (e.g., key fob) or otherwise manipulating a processing system of the control apparatus 1000.

In step 28, the intelligent automotive component 1 obtains the respective remote activation request signal (RARS) via the IAC transceiver 9. In response to obtaining the remote activation request signal (RARS) via the control apparatus 1000 the one or more processor(s) 6 is configured to generate and distribute a first switch control signal (FSCS) to the secondary power functioning unit 39 power functioning controller 42 to allocate voltage power (e.g., current) to the fuel pump portion wire lead and portion B hold-in 36 via $_{or}gate^2$ by way of controlling the state of switch controller[3] 41 allocating power to $_{or}gate^2$, and configured to generate and distribute n second switch control signal (SSCS) to the primary power functioning unit 3 power functioning controller 20 to restrict voltage power (e.g., current) to the fuel pump portion wire lead and portion B hold-in 36 via $_{or}gate^2$ by way of controlling the state of switch controller 231 restricting power to $_{or}gate^2$.

Further, the one or more processor(s) 6 is configured to request the one or more battery(s) 27 contextual battery capacity levels from the power functioning controller 20 under the control of the one or more processor(s) 6, in response to obtaining the contextual battery capacity levels the one or more processor(s) 6 preforms one or more computations in relations to instruction within the battery capacity control database 16 order to determine a respective battery capacity control signal (BCCS) to distribute to the power functioning controller 20.

For instance, during the one or more processor(s) 6 requesting and obtaining the contextual battery capacity levels the battery measurement circuit 33 may be configured to translate the contextual battery capacity levels in an format at which the one or more processor(s) 21 may better understand such as an number value representing an percentage (e.g., 90%) or the like(s).

Specifically, during the one or more processor(s) 6 one or more computation tasks if the obtained contextual battery(s) capacity level is ≤100%, <100% but >75% or ≤75% the one or more processor(s) 6 is configured to distribute battery capacity control signal 4 (BCCS4) to the power functioning controller 20, whereas switch controller[1] 4 & switch controller[4] 43 is at a state restricting power to the one or more battery(s) 27.

If the obtained contextual battery capacity levels is <75% the one or more processor(s) 6 is configured to distribute battery capacity control signal 3 (BCCS3) to the power functioning controller 20, whereas switch controller[1] 4 is at a state allocating power to the one or more battery(s) 27 & switch controller[4] 43 is at a state restricting power to the one or more battery(s) 27. If the obtained contextual battery capacity levels is ≤50% or <50% the one or more processor(s) 6 is configured to distribute battery capacity control signal 2 (BCCS2) to the power functioning controller 20, whereas switch controller[1] is at a state allocating power to the one or more battery(s) 27 & switch controller[4] 43 is at a state restricting power to the one or more battery(s) 27. If the obtained contextual battery capacity levels is ≤25% or <25% the one or more processor(s) 6 is configured to distribute battery capacity control signal 1 (BCCS1) to the power functioning controller 20, whereas switch controller[1] 4 is at a state restricting power to the one or more battery(s) 27 & switch controller[4] 43 is at a state allocating power to the one or more battery(s) 27. However, during recharging of the one or more battery(s) 27 the one or more processors(s) 6 periodically request the battery capacity levels at a predetermine interval until the battery measurement circuit 33 returns a battery capacity level equivalent to 100%. Specifically, the predetermine interval time frame at which the one or more processor(s) 6 request the battery capacity level during the charging process is approximately every 3 to 5 minutes.

Further, upon the one or more processor(s) 6 obtaining the contextual battery capacity levels and preforming the one or more computations in order to determine a respective battery capacity control signal to distribute to the power functioning controller 20 the one or more processor(s) 6 is configured to store the contextual battery capacity level in the one or more memory(s) 19 as a confirmed battery capacity level (CBCL) data 38.

In step 11, in response to the one or more processor(s) 6 activating the intelligent automotive component 1 via distributing a first switch control signal (FSCS) to the power functioning controller 42 controlling the state of switch controller³ 41 to allocate voltage power (e.g., current) to the fuel pump portion wire lead and portion B hold-in 36 via the secondary power functioning unit 3 distributing a operation power to $_{or}$gate 2, and the one or more processor(s) 6 obtaining the contextual battery capacity level and preforming one or more computations in order to determine a respective battery capacity control signal (BCCS) to distribute to the power functioning controller 20, the intelligent automotive component 1 distributes a respective component state signal (CSS) regarding the state of the intelligent automotive component 1 and the one or more components of the intelligent automotive components 1 to the control apparatus 1000 under the control of the one or more processor(s) 6.

The component state signal (CSS) composes two portions the intelligent automotive components state signal (IACSS) and battery state signal (BSS). The intelligent automotive component state signal (IACSS) comprises data revealing the current status of the intelligent automotive component 1. For instance, the intelligent automotive component state signal is a notification indicating the word "IAC Activated". The battery state signal (BSS) comprises data revealing the contextual battery capacity level of the one or more battery(s) 27. For instance, the battery state signal (BSS) is a notification indicating a number percentage (e.g., 70%). However, corresponding battery state signals (BSS) may also be distributed respectively after distributing the component state signal (CSS) envisioned to update a prior battery capacity level.

In order to accomplish this, the one or more processor(s) 6 is configured to generate and distribute a battery capacity request signal (BCRS) to the power functioning controller 20 to obtain the battery capacity levels, in response to obtaining the battery capacity levels the intelligent automotive component 1 is configured to generate and distribute a component state signal (CSS) to the control apparatus 1000 under the control of the one or more processor(s) 6.

In step 29, the control apparatus 1000 is configured to obtain the component state signal (CSS) via the CA transceiver 17 under the control of the one or more processor(s) 32, in response the one or more CA processor(s) 24 is configured to obtain the component state signal (CSS) and display the current status of the intelligent automotive component 1 on the display 10, wherein intelligent automotive components state signal (IACSS) is the phrase "IAC Activated" and the battery state signal (BSS) is a number value representing a percentage (e.g., 70%). This phrase and number value may be displayed on a side panel, drop down menu or first screen of the display 10, other suitable indications may be displayed to notify the user the state of the intelligent automotive component 1.

In step 34, during activation of the intelligent automotive component 1 the one or more processor(s) 6 is configured to periodically request the battery capacity level(s) (BCL) via the power functioning controller 20 to update the confirmed battery capacity level (CBCL) stored in the one or more memory(s) 19 and the battery capacity levels displayed on the control apparatus 1000 display 10 at intervals under the control of the one or more processor(s) 6. In response to obtaining the contextual battery capacity level via the power functioning controller 20 the one or more processor(s) 6 is configured to request the confirmed battery capacity level (CBCL) stored in the one or more memory(s) 19 data 38 and execute one or more computation to determine if the obtained contextual battery capacity level is > (e.g., greater than), < (e.g., less then) or ≤ (e.g., equal to) the confirmed battery capacity level (CBCL). However, if the obtained contextual battery capacity level is > (e.g., greater than) or < (e.g., less than) the confirmed battery capacity level the IAC transceiver 9 is configured to distribute a battery state signal (BSS) (e.g., battery capacity level) to the control apparatus 1000 under the control of the one or more processor(s) 6. And if the obtained contextual battery capacity level is ≤ (e.g., equal to) the confirmed battery capacity level (CBCL) no battery state signal (BSS) is distributed to the control apparatus 1000. Specifically, the interval at which the one or more processor(s) 6 periodically request the battery capacity levels during activation of the intelligent automotive component 1 is every 3 to 5 minutes.

FIG. 6 is a flowchart of a process for remotely deactivating a automobile intelligent automotive component 1 in accordance with a exemplary embodiment of the present invention. The method 46 comprises the steps of the control apparatus 1000 distributing a respective remote deactivation request signal (RDRS) to the intelligent automotive component 1 via the CA transceiver 17, upon the intelligent automotive component(s) 1 obtaining the respective remote deactivation request signal (RDRS) via the IAC transceiver 9 the one or more processor(s) 6 is configured to control the state of the one or more switch controller(s) to restrict voltage power (e.g., current) to the fuel pump portion wire lead and portion B hold-in 36, obtain battery capacity levels and the state of the intelligent automotive component 1 and distribute one or more notifications to the control apparatus 1000 via the IAC transceiver 9.

Step 12 begins with the user of the control apparatus 1000 distributing an remote deactivation request signal (RDRS) to deactivate the one or more intelligent automotive component(s) 1 (step 47). In a preferred embodiment, an user may distribute the remote deactivation request signal (RDRS) by physical interaction with an input button disposed on the control apparatus 30 (e.g., key fob) or otherwise manipulating a processing system of the control apparatus 1000.

In step 47 the intelligent automotive component 1 obtains the respective remote deactivation request signal (RDRS) via the IAC transceiver 9. In response to obtaining the remote deactivation request signal (RDRS) via the control apparatus 1000 the one or more processor(s) 6 is configured to distribute a first switch control signal (FSCS) to the secondary power functioning unit 39 power functioning controller 42 to restrict voltage power (e.g., current) to the fuel pump portion wire lead and portion B hold-in 36 via $_{or}$gate² by way of controlling the state of switch controller³ 41 restricting voltage power to $_{or}$gate², and further configured to distribute a second switch control signal (SSCS) to the primary power functioning unit 3 power functioning controller 20 to restrict voltage power (e.g., current) to the fuel pump portion wire lead and portion B hold-in 36 via $_{or}$gate² by way of controlling the state of switch controller² 31 restricting voltage power to $_{or}$gate².

Further, during deactivating of the intelligent automotive component 1 voltage power may still be applied to the primary and secondary power functioning unit 3, 39 if the automobile ignition is at the run position but voltage power is restricted at the fuel pump portion wire lead or portion B hold-in 36 due to switch controller 341 state restricting voltage power to $_{or}$gate².

In step 48, in response to the one or more processor(s) 6 deactivating the intelligent automotive component 1 via distributing a first switch control signal (FSCS) to the secondary power functioning unit 39 power functioning controller 42 controlling the state of switch controller³ 41 restricting voltage power (e.g., current) to the fuel pump portion wire lead and portion B hold-in 36 via $_{or}$gate$^2$, and distributing a second switch control signal (SSCS) to the primary power functioning unit 3 power functioning controller 20 restricting voltage power (e.g., current) to the fuel pump portion wire lead and portion B hold-in 36 via $_{or}$gate$^2$ by way of controlling the state of switch controller$^2$ 31 restricting voltage power to $_{or}$gate 2. The intelligent automotive component 1 distributes a respective component state signal (CSS) to the control apparatus 1000 regarding the status of the intelligent automotive component 1 and the contextual battery capacity level of the one or more battery(s) 27 under the control of the one or more processor(s) 6.

The component state signal (CSS) composes two portions the intelligent automotive components state signal (IACSS) and battery state signal (BSS). The intelligent automotive component state signal (IACSS) comprises data revealing the current status of the intelligent automotive component 1. For instance, during deactivation the intelligent automotive component state signal is a notification indicating the word "IAC Deactivated". The battery state signal (BSS) comprises data revealing the contextual battery capacity level of the one or more battery(s) 27. For instance, the battery state signal (BSS) is a notification indicating a number percentage (e.g., 70%) indicating the remaining capacity of the one or more battery(s) 27. However, corresponding battery state signals (BSS) may also be distributed respectively after distributing the component state signal (CSS) envisioned to update a prior battery capacity level.

In order to accomplish this, the one or more processor(s) 6 is configured to generate and distribute a battery capacity request signal (BCRS) to the power functioning controller 20 to obtain the battery capacity levels, in response to obtaining the battery capacity levels the intelligent automotive component 1 is configured to generate and distribute a component state signal (CSS) to the control apparatus 1000 under the control of the one or more processor(s) 6.

In step 49, the control apparatus 1000 is configured to obtain the component state signal (CSS) via the CA transceiver 17 under the control of the one or more processor(s) 32, in response the processor(s) 32 is configured to obtain the component state signal (CSS) and display the current status of the intelligent automotive component 1 on the display 10, wherein during deactivation the intelligent automotive component state signal (IACSS) is the phrase "IAC Deactivated" and the battery state signal (BSS) is a number value representing a percentage (e.g., 70%). This phrase and number value may be displayed on an side panel, drop down menu or first screen of the display 10, other suitable indications may be displayed to notify the user the state of the intelligent automotive component 1.

In step 60, during deactivation of the intelligent automotive component 1 the one or more processor(s) 6 is configured to periodically request the one or more battery capacity level(s) (BCL) at intervals via the power functioning controller 20 to update the confirmed battery capacity level (CBCL) stored in the one or more memory(s) 19 and the battery capacity levels displayed on the control apparatus 1000 display 10 under the control of the one or more processor(s) 6. In response to obtaining the contextual battery capacity level via the power functioning controller 20 the one or more processor(s) 6 is configured to request the confirmed battery capacity level (CBCL) stored in the one or more memory(s) 19 data 38 and execute one or more computation to determine if the obtained contextual battery capacity level is > (e.g., greater than), < (e.g., less then) or ≤ (e.g., equal to) the confirmed battery capacity level (CBCL). However, if the obtained contextual battery capacity level is > (e.g., greater than) or < (e.g., less than) the confirmed battery capacity level the IAC transceiver 9 is configured to distribute a battery state signal (BSS) (e.g., battery capacity level) to the control apparatus 1000 under the control of the one or more processor(s) 32. And if the obtained contextual battery capacity level is ≤(e.g., equal to) the confirmed battery capacity level (CBCL) no battery state signal (BSS) is distributed to the control apparatus 1000. Specifically, the interval at which the one or more processor(s) 6 periodically request the battery capacity levels during activation of the intelligent automotive component 1 is every 3 to 5 minutes.

Step 61 next involves determining if the battery capacity levels is less than, greater than or equal to battery capacity level 25%. This step is accomplished by the one or more processor(s) 6 as an result of determining if the obtained contextual battery capacity level is less than or equal to battery capacity level 25% to control the state of the one or more switch controllers. Specifically, during deactivation of the intelligent automotive component 1 the one or more processor(s) 6 is configured to periodically request the battery capacity levels via the power functioning controller 20. If the obtained battery capacity level is < (e.g., less than) or ≤ (e.g., equal to) battery capacity level 25%, the one or more processor(s) 6 is configured to distribute a switch control signal (SCS) to the secondary power functioning unit 39 power functioning controller 42 to control the state of switch controller$^5$ 37 to allocate power (e.g., current) to $_{or}$gate$^1$. If the obtained battery capacity level is > (e.g., greater than) battery capacity level 25%, no switch control signal is distributed to the secondary power functioning unit 39 power functioning controller 42. However, at this point power is not actually distributed to $_{or}$gate$^1$ until the automobile ignition is at the nm position, though switch controller$^5$ 37 is respectively at a state allocating power to the processing circuit 44 in case the one or more battery(s) 27 capacity levels value reaches 0% before the next remote activation request signal (RARS) is obtained, this allocates the processing circuit 44 to obtain a data carrier current to boot the processing circuit 44. In conjunction, during deactivation of the intelligent automotive component 1 if the battery capacity level (BCL) reaches a value of 0% the primary power functioning unit 3 is incapable of distributing operation power to the processing circuit 44, therefore a operation power is distributed to the processing circuit 44 via the secondary power functioning unit 39 via $_{or}$gate$^1$, in response to the secondary power functioning unit 39 obtaining a data carrier current via the automobile power/signal input device and portion A hold-in 25 when the automobile ignition is at the run position and switch controller$^5$ 37 at a state allocating a voltage power to the processing circuit 44 step 62. While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may included variations in size shape form function and manner of operation. The assembly and use of the present invention are deemed readily apparent and obvious to one skilled in the art.

I claim:

1. A system for remotely activating and deactivating an intelligent automotive component of a automobile, the system comprising:

a control apparatus having a transceiver coupled to one or more processors, wherein the one or more processors of the control apparatus are configured to distribute a remote activation and remote deactivation request signal to a power-link apparatus; and wherein the one or more processors of the control apparatus are configured to obtain a component state signal from the power-link apparatus based upon the power-link apparatus obtaining the remote activation or the remote deactivation request signal and one or more processors of the power-link apparatus determining an capacity level of a battery of the power-link apparatus; and one or more switch controllers disposed on a circuitry of the power-link apparatus, and wherein the one or more switch controllers of the power-link apparatus operate at an on and an off state based upon the one or more processors of the power-link apparatus obtaining the remote activation and remote deactivation request signal via the control apparatus;

wherein upon the one or more processors of the power-link apparatus obtaining the remote activation request signal the one or more processors of the power-link apparatus are configured to generate and distribute a first switch control signal to a power functioning controller (42) of the power-link apparatus, and wherein the power functioning controller (42) is configured to configure a third switch controller (41) to an on state to allocate voltage power to a pump portion or a portion B hold-in of the intelligent automotive component via a second $_{or}$gate of the power-link apparatus based upon the power functioning controller (42) obtaining the first switch control signal; and wherein upon the one or more processors of the power-link apparatus obtaining the remote deactivation request signal the one or more processors of the power-link apparatus is configured to generate and distribute a second switch control signal to the power functioning controller (20) of the power-link apparatus, and wherein the power functioning controller (20) is configured to configure a third switch controller (31) to an off state to restrict voltage power to the pump portion or g portion B hold-in of the intelligent automotive component via the second $_{or}$gate based upon the power functioning controller of the power-link apparatus obtaining the second switch control signal;

wherein upon the one or more processors of the power-link apparatus obtaining the remote deactivation request signal the one or more processors of the power-link apparatus are configured to generate and distribute the first switch control signal to the power functioning controller (42) of the power-link apparatus, and wherein the power functioning controller (42) is configured to configure the third switch controller (41) to the off state to restricting voltage power to the pump portion or the portion B hold-in of the intelligent automotive component via the second $_{or}$gate of the power-link apparatus based upon the power functioning controller (42) of the power-link apparatus obtaining the first switch control signal; and wherein upon the one or more processors of the power-link apparatus obtaining the remote deactivation request signal the one or more processors of the power-link apparatus is configured to generate and distribute the second switch control signal to the power functioning controller (20), and wherein the power functioning controller (20) is configured to configure the third switch controller (31) to the off state to restrict voltage power to the pump portion or the portion B hold-in of the intelligent automotive component via the second $_{or}$gate based upon the power functioning controller of the power-link apparatus obtaining the second switch control signal.

2. The system of claim 1, wherein the control apparatus is a key fob.

3. The system of claim 1, wherein the component state signal comprises two portions.

4. The system of claim 3, wherein the two portions of the component state signal is comprises a intelligent automotive components state signal; and a battery state signal.

5. A method for remotely activating an intelligent automotive component, the method comprising:

obtaining, by one or more processors of a power-link apparatus, a respective remote activation request signal via a control apparatus, and wherein upon the one or more processors of the power-link apparatus are configured to generate and distribute a first switch control signal to a power functioning controller (42) of the power-link apparatus, and wherein the power functioning controller (42) of the power-link apparatus is configured to configure a third switch controller (41) to an on state to allocate voltage power to a pump portion or a portion B hold-in of the intelligent automotive component via a second $_{or}$gate of the power-link apparatus based upon the power functioning controller (42) of the power-link apparatus obtaining the first switch control signal; and wherein upon the one or more processors of the power-link apparatus obtaining die a remote deactivation request signal the one or more processors of the power-link apparatus is configured to generate and distribute a die second switch control signal to the power functioning controller (20) of the power-link apparatus, and wherein the power functioning controller (20) is configured to configure a third switch controller (31) to an off state to restrict voltage power to the feel pump portion and the portion B hold-in of the intelligent automotive component via the second $_{or}$gate based upon the power functioning controller of the power-link apparatus obtaining the second switch control signal; and distributing, by the one or more processors of the power-link apparatus, a component state signal to the control apparatus to notify a user of the control apparatus a current state of the intelligent automotive component.

6. A method for remotely deactivating an intelligent automotive component, the method comprising:

obtaining, by one or more processors of a power-link apparatus, a respective remote deactivation request signal via a control apparatus, and wherein upon the one or more processors of the power-link apparatus obtaining the remote deactivation request signal the one or more processors of the power-link apparatus are configured to generate and distribute a first switch control signal to a power functioning controller (42) of the power-link apparatus, and wherein the power functioning controller (42) of the power-link apparatus is configured to configure a third switch controller (41) to an off state to restrict voltage power to a pump portion or a portion B hold-in of the intelligent automotive component via a second or gate of the power-link apparatus based upon the power functioning controller

(42) of the power-link apparatus obtaining the first switch control signal; and wherein upon the one or more processors of the power-link apparatus obtaining the remote deactivation request signal the one or more processors of the power-link apparatus are configured to generate and distribute a second switch control signal to the power functioning controller (20) of the power-link apparatus, and wherein the power functioning controller (20) is configured to configure a third switch controller (31) to an off state to restrict voltage power to the pump portion and or the portion B hold-in of the intelligent automotive component via the second or gate based upon the power functioning controller of the power-link apparatus obtaining the second switch control signal; and distributing, by the one or more processors of the power-link apparatus, a component state signal to the control apparatus to notify a user of the control apparatus a current state of the intelligent automotive component.

\* \* \* \* \*